INFRARED ABSORPTION SPECTRUM (KBr)

ULTRAVIOLET ABSORPTION CURVE
METHANOL SOLUTION (CONCENTRATION 10 p.p.m.)

INVENTORS
ISAO TAKEDO
MASAYUKI MIZUNO
TOSHIAKI SUGAWARA
YUKIJI SHIMOJIMA
SADAYUKI HORIGUCHI

United States Patent Office 3,825,660
Patented July 23, 1974

3,825,660
ANTIBIOTIC NO. 156 AND PROCESS FOR PRODUCING THE SAME
Isao Takeda, Tokyo, Masayuki Mizuno, Saitama, Toshiaki Sugawara and Yukiji Shimojima, Tokyo, and Sadayuki Horiguchi, Kanagawa, Japan, assignors to Asahi Kasei Kogyo Kabushiki Kaisha, Osaka, Japan
Filed Oct. 6, 1971, Ser. No. 186,976
Claims priority, application Japan, Nov. 5, 1970, 45/96,847, 45/96,848
Int. Cl. A61k 21/00
U.S. Cl. 424—119                                           7 Claims

ABSTRACT OF THE DISCLOSURE

An antibiotic named as antibiotic No. 156 which having an elementary analysis of C, 55.07%, H, 7.82%, N, 6.33% and O, 29.92%, an optical rotation of $(\alpha)_D^{18}$ of +4.3° in aqueous n-butanol, a melting point of 210° C. or more, a molecular weight of 890, and the infrared and ultra-violet absorption spectra shown in the accompanying FIGS. 1 and 2, respectively.

Figure 1:
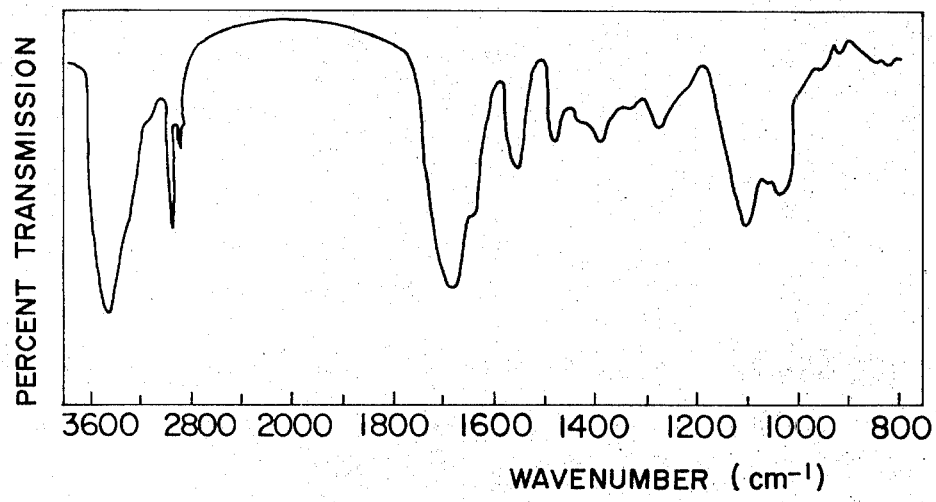

This antibiotic is useful for controlling rice blast disease, and is prepared by aerobically culturing Streptomyces 156 (NRRL 5319) in a liquid medium containing a carbon source, a nitrogen source and inorganic salts, and may be isolated from both mycelium and culture filtrate.

---

This invention relates to a novel antibiotic No. 156 which is useful for the control of rice blast disease, and a process for producing the same.

A large number of chemicals have heretofore been used for the control of rice blast disease, but none of them have been satisfactory in effectiveness and phytotoxicity, particularly in persistent effect and toxicity.

The present inventors have found that a strain of actinomycete isolated from soil recovered in Ikeda City, Osaka, Japan, produces a substance having excellent activity as a rice blast disease-controlling chemical.

An object of this invention is to provide the novel antibiotic No. 156. Another object of this invention is to provide a method for producing the novel antibiotic No. 156. Other objects and advantages of this invention will be apparent from the description set forth hereinbelow.

The microorganism used in the present invention was isolated from soil for the first time by the present inventors, and has been denominated as Streptomyces 156. The microorganism has been deposited in Fermentation Research Institute Science and Technology, Chiba City, Japan, under FERM-P No. 707. It is also deposited with the United States Department of Agriculture, Northern Regional Research Laboratory, Peoria, Ill., United States of America and has been given the number NRRL 5319. A sample of this microorganism can be obtained from aforesaid Research Laboratory. The deposit was made with all restrictions on the availability to the public being irrevocably removed upon the granting of the patent.

Taxonomic characteristics of Streptomyces 156 are as follows:

I. MORPHOLOGICAL CHARACTERISTICS

Formation of dense, spiral aerial mycelium on starch and potato media. Spores oval, 0.8 to 0.9 by 1.2 to 1.4 microns, surface smooth.

II. BEHAVIORS ON VARIOUS CULTURE MEDIA (1) Czapek's agar: Good growth, white surface circumference with bluish ash-gray interior and ivory reverse. Aerial mycelium powdery, abundant; no soluble pigment.

(2) Asparagine-glucose agar: Growth somewhat restricted, substantially colorless, glossy surface. No aerial mycelium. No pigment.

(3) Ca-malate agar: Good growth, substantially colorless, later becoming bright ash-gray. Aerial mycelium powdery, ash-gray. No pigment.

(4) Glucose-Czapek broth: Moderate surface growth, dark gray. Aerial mycelium scant, ash-gray.

(5) Nutrient agar: Moderate, flat growth, milky brown; no aerial mycelium. Scant brown pigment.

(6) Loeffler's serum: Poor growth, bluish black on the first to second day, later becoming milky brown. No aerial mycelium; no soluble pigment.

(7) Peptone-glucose agar: Good growth with wrinkled colonies, grayish pale brown; no aerial mycelium; scant yellowish brown pigment.

(8) Egg-albumin agar: Grayish white growth with powdery, ash-gray aerial mycelium. No pigment.

(9) Gelatin: Surface growth, brownish white; moderate gelatin liquefaction. Scant brown pigment.

(10) Starch agar: Good growth with yellowish green reverse and somewhat white circumference. Aerial mycelium abundant, pale purple, powdery; no pigment.

(11) Tyrosine agar: Growth restricted to flat small colonies; aerial mycelium scant, gray, powdery. Good melanin formation.

(12) Litmus milk: Surface growth grayish cream-colored; milk peptonized without coagulation.

(13) Cellulose medium: No growth.

III. UTILIZATION OF CARBON SOURCES

Good growth with utilization of glucose, sucrose, galactose and maltose, but medium growth with xylose, arabinose, fructose, rhamnose, raffinose, mannitol, inositol, lactose, inulin, sorbitol and sodium succinate. Sodium citrate is scarcely utilized, and salicin and sodium acetate are not utilized.

According to Waksman: "The Actinomycetes," strains which are close in behavior, particularly in morphological behavior, to Streptomyces 156 of the present invention are Streptomyces albus, Streptomyces calvus, Streptomyces griseochromogenes and Streptomyces lavendulae. When compared with Streptomyces 156, the above-mentioned strains differ therefrom in the following points:

Streptomyces 156 is positive in melanin formation and the aerial mycelium thereof on starch agar is abundant, pale purple and powdery. However, Streptomyces albus is negative in melanin formation and the aerial mycelium thereof on starch agar is white, and Streptomyces calvus is also negative in melanin formation and the aerial mycelium thereof on starch agar is white to grayish white. Streptomyces griseochromogenes differs in melanin formation from Streptomyces 156 as in the above-mentioned cases, and the former produces a brown pigment in a protein-containing medium, whereas Streptomyces 156 produces no substantial pigment. Further, the sporophores of Streptomyces griseochromogenes are closed spirals, whereas those of Streptomyces 156 are loose spirals. Streptomyces lavendulae produces a brown pigment in a protein-containing medium, whereas Streptomyces 156 scarcely produces pigment, and the two strains do not coincide each other in color of aerial mycelium.

Thus, the above-mentioned four strains do not coincide in behaviors with Streptomyces 156. Accordingly, it is proper to conclude that Streptomyces 156 is a new strain.

Procedures for culturing the aforesaid microorganism to produce an effective substance, and purifying and isolating said substance from the culture liquor and myceluim are explained below.

For the culture of the present strain, the strain is aerobically cultured in a medium containing a carbon source, a nitrogen source, and inorganic salts. An organic nitrogen source may preferably be used as said nitrogen source. The temperature preferable for the culture is 25° to 35° C. pH for the culture is preferably from 6 to 9. The carbon source may be starch, glucose, sucrose, molasses and/or glycerin. Soluble starch displays the highest antibiotic-producing ability. As the nitrogen source, soybean flour, polypepton, yeast extract, meat extract etc. may be used. In the case where soybean flour is used in combination with starch, the amount of the desired substance produced is maximum. As the inorganic salts, there may be added sodium chloride in addition to phosphate, potassium salt and magnesium salt. The phosphate and the other salts are not critical, as long as they are not toxic. The concentrations of these additives may be the same as in the case where any of the known microorganisms are cultured.

The present antibiotic is contained in both the culture filtrate obtained by culturing Streptomyces 156 and the mycelium thereof. The substance can easily and efficiently be recovered by n-butanol extraction from the culture filtrate and by acetone extraction from the mycelium.

The active components recovered from the culture filtrate and the mycelium, respectively, are individually purified with caustic alkali and then subjected to adsorption chromatography and/or thin layer chromatography. Both components manifest entirely the same characteristics and behavior with respect to $Rf$ values in thin layer chromatography using various solvents, and in infrared absorption spectra, biological activities, etc., so that they are recognized as being the same substance.

The physicochemical and biological properties of the present product are as follows:

Elementary analysis: C, 55.07%; H, 7.82%; N, 6.33%; O, 29.92%.

Optical rotation: $(\alpha)_D^{18} = +4.3°$ (c.=0.2%, in n-BuOH aq.).

Melting point: m.p. (decomp.) $\geq 210°$ C.

Molecular weight: 890.

Solubility in solvents: The standard product is soluble in methanol, ethanol, hydrated n-butanol and pyridine and insoluble in ethyl acetate, ethyl ether, benzene, methylethylketone, acetone, n-hexane, petroleum ether and water. The fact that it is soluble in an aqueous caustic soda solution at a concentration of 1N or more and in an aqueous ammonia solution at a conc. of 0.5N or more, and that it is insoluble in water at neutral to acidic pH, shows that the standard product is a weakly acidic substance.

Stability: At a pH within the range from 2 to 14, the product is quite stable at room temperature. At a pH within the range from 2 to 11, deactivation of the product is not observed even when heated at 100° C. for 10 minutes. It is not decomposed by ultraviolet irradiation.

Color of the substance: Purified product is a white powder.

Infrared absorption spectrum: As shown in FIG. 1.

Figure 2:
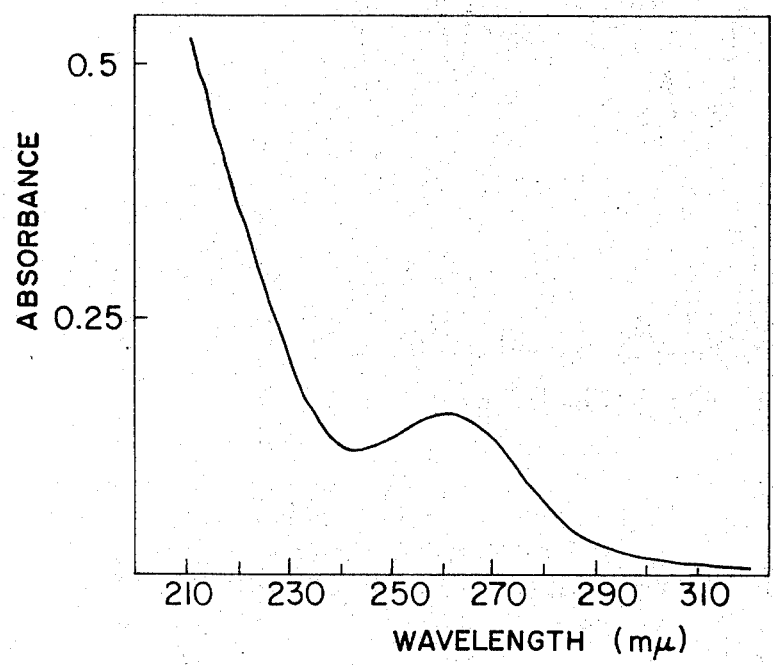

Ultraviolet absorption spectrum: As shown in FIG. 2.

Color reaction: The product is negative in anthrone reaction, Ninhydrin reaction, Elson-Morgan reaction and Hanes-Isherwood reaction. Furthermore, the product exhibits a brown color when heated to 120° C. after being sprayed with an anisaldehyde-$H_2SO_4$ reagent.

Antimicrobial action: Antimicrobial activity of the antibiotic was tested by agar diffusion method. The following media were used.

Bacteria: nutrient agar.
Molds: glucose-yeast extract-malt extract agar.
Yeasts: nutrient agar containing 0.5% malt extract.

| Test microorganisms: | Minimum inhibitory concentration ($\mu$g./ml.) |
|---|---|
| Staphylococcus aureus FDA 209P | 100 or more. |
| Bacillus subtilis PCI 219 | 1 or less. |
| Sarcina lutea PCI 1001 | 100. |
| Erwinia carotovora IFO 3057 | 100 or more. |
| Xanthomonas oryzae IAM 1657 | 100 or more. |
| Xanthomonas citri IFO 3835 | 100 or more. |
| Escherichia coli K-12 | 100 or more. |
| Vibrio metschnikovii B-3-6 | 100 or more. |
| Mycobacterium 607 | 50. |
| Pseudomonas aeruginosa IAM 1057 | 100 or more. |
| Pseudomonas solanacearum | 1. |
| Aspergillus oryzae L | 100 or more. |
| Aspergillus niger ATCC 6275 | 100 or more. |
| Rhizopus nigricans Ehrenberg SN32 | 50. |
| Penicillium citrinum ATCC 9849 | 100 or more. |
| Trichophyton mentagrophytes IAM 5064 | 100 or more. |
| Glomerella lagenarium IAM 8051 | 50. |
| Alternaria kikuchiana | 100. |
| Fusarium oxysporum | 100 or more. |
| Botrytis cinarea | 50. |
| Helminthosporium sigmoideum botrytis (inerea) | 50. |
| Piricularia oryzae $A_1$ | 1. |
| Candida albicans (Robin) Berkhout IAM 4888 | 50. |
| Saccharomyces cerevisiae Hansen Kyokai-6 | 10. |
| Pellicularia sasakii | 20. |

The present substance inhibits the growth of Piricularia oryzae on an agar medium containing rice straw extract at pH 5.0 (Journal of Antibiotics, Vol. 18, page 104, 1965). The most characteristic feature is that the present antibiotic induces swelling of mycelia of germinated spores of Piricularia oryzae, with the result that said pathogenic fungus dies. The present substance can also inhibit spore germination and/or elongation of the mycelia.

As substances capable of inducing the above-mentioned swelling of mycelia, there have been known Polyoxins [K. Isono et al.: Agr. Biol. Chem., 29, 848–854 (1965)], and Bulgerin [J. Shoji et al.: J. Antibiotics, 23, 295–299 (1970)]. However, both the Polyoxins and Bulgerin are soluble in water, whereas the antibiotic No. 156 is insoluble in water at a neutral to acidic pH and hence can clearly be distinguished from said substances. In view of the above, the present inventors have concluded that the present substance as a novel antibiotic.

The novel antibiotic No. 156 has an excellent effect for the control of rice blast disease in paddy and upland fields and can be used as a chemical for controlling other plant diseases.

In application as a plant disease-controlling chemical, the present antibiotic may be used as it is. Generally however, the antibiotic is dissolved or dispersed in a suitable carrier (e.g. solvent) or mixed with or adsorbed on a suitable solid (e.g. diluent or extender) and, if necessary, is incorporated with one or two or more of emulsifiers, dispersants, suspending agents, spreaders, penetrants, wetting agents, tackifiers, stabilizers, etc., and the resulting mixture is used as a base for any of oil sprays, emulsifiable concentrates, wettable powders, dusts, tablets, fumigants and the like preparations.

In applying the chemical of this invention as, for example, a rice blast disease-controlling chemical, it is desirable that the chemical is sprayed so that the proportion of the active ingredient is 1 to 100 mg. per m.$^2$, though the proportion varies depending on the application purpose and application conditions. The concentration of the active ingredient in the fungicide is preferably about 1 to 20% in case the fungicide is in the form of emulsifiable concentrate or wettable powder, and about 0.05 to 1.0% in case the fungicide is in the form of oil spray or dust. However, the concentration may suitably be varied according to application purposes so long as the composition as applied contains an amount of active ingredient which is effective to control rice blast or other disease to be treated.

In case the fungicide according to this invention is in the form of emulsifiable concentrate or wettable powder, it may be diluted with water or the like to, for example, 500 to 2,000 times, and the resulting emulsion or solution may be sprayed.

Examples of preferable solvents for use in the compositions of the present invention include water, alcohols (e.g. methanol, ethanol, ethylene glycol, etc.), ketones (e.g. acetone, methylethylketone, etc.), ethers (e.g. dioxane, tetrahydrofuran, ether, etc.), aliphatic hydrocarbons (e.g. gasoline, kerosene, machine oil, fuel oil, etc.), aromatic hydrocarbons (e.g. benzene, toluene, xylene, solvent naphtha, methylnaphthalene, etc.), organic bases (e.g. pyridine, picoline, etc.), acid amides (e.g. dimethylformamide, etc.), esters (e.g. ethyl acetate, etc.) and nitriles (e.g. acetonitrile, etc.). These may be used either alone or in the form of mixtures of 2 or more. Examples of the diluents and extenders used in the present invention include vegetable powders such as soybean powder, tobacco powder, walnut powder, wheat flour and rice flour, mineral powders such as kaolin, bentonite, acid clay, talc, diatomaceous earth and mica powder, alumina, silica gel, sulfur powder and active carbon. These may be used either alone or in the form of mixtures of 2 or more. Examples of surface active agents which are used in the present invention as spreaders, emulsifiers, penetrants, dispersants and solubilizers include soaps, sulfuric acid esters of higher alcohols, sulfonated oils, ethanolamine soaps, higher fatty acid esters, alkylarylsulfonates, quaternary ammonium salts, alkylene oxide type surface active agents and anhydrosorbitol type surface active agents. In addition thereto, there may be added, if necessary, caseine, gelatine, agar, starch, bentonite, aluminum hydroxide or the like.

The blends prepared in the above manner can be more broadened in application scope and enhanced in controlling effect when used in admixture with other chemicals such as insecticides (synthetic or natural), miticides, nematocides, microbicides, herbicides, plant growth regulators, synergists, attractants, etc.

The present invention is illustrated in detail below with reference to examples.

Example 1

Streptomyces 156 (FERM P–No. 707; NRRL 5319) was inoculated in a 500 ml. shaking flask containing 100 ml. of a medium containing 2% (wt./vol.) of soluble starch, 1% wt./vol.) of soybean meal, 0.1% (wt./vol.) of potassium phosphate dibasic, 0.3% (wt./vol.) of sodium chloride, 0.05% (wt./vol.) of magnesium sulfate and 0.2% (wt./vol.) of calcium carbonate (pH 7.0, before sterilization), and shaken reciprocally at 30° C. for 72 hours. One liter of the thus obtained culture was centrifugally separated into a cell residue and a culture filtrate. The cell residue was diluted with 500 ml. of acetone and then allowed to stand overnight at 30° C. to obtain an acetone extract. The acetone in said extract was distilled under reduced pressure, and then the residue was extracted 3 times with 100 ml. of n-butanol. An effective component in the culture filtrate was extracted 3 times with 100 ml. of n-butanol. The resulting extracts were combined with the cell extracts and shaken 3 times together with 200 ml. of a 2N-aqueous caustic soda solution. The caustic soda liquid layers were united together, adjusted to pH 3 with concentrated hydrochloric acid at 5° C., and then extracted 3 times with 100 ml. of n-butanol. The combined extract was washed with water until the wash liquid became neutral and then dried under reduced pressure to obtain 110 mg. of a crude substance.

100 milligrams of the crude substance thus obtained was subjected to the column containing 10 g. of silica gel (Nishio Chemical). The column was washed with acetone, and then eluted with a mixed solvent comprising acetone and ethanol in a volume ratio of 1:1 to obtain an active fraction containing 85 mg. of the active substance. This fraction was subjected to thin layer chromatography using silica gel and developed with a mixed solvent comprising n-butanol, acetic acid and water in a volume ratio of 4:1:1. The active band ($R_f$ 0.7–0.8) of the chromatogram was revealed, by spraying of water, as a water repellent band, which was cut out and then eluted with a mixed solvent comprising pyridine and water in a volume ratio of 1:4 to obtain 35 mg. of pure antibiotic No. 156.

Example 2

Streptomyces 156 (FERM P No. 707; NRRL 5319) was inoculated to a 500 ml. shaking flask containing 100 ml. of a medium of the same composition as in Example 1, and then shaken reciprocally at 30° C. for 24 hours. 50 milliliters of the culture was transferred under sterile conditions to a 5-liter-Erlenmeyer flask containing 1 liter of a medium of the same composition as above, and then subjected to rotary shaking at 30° C. for 72 hours 10 liters of the thus obtained culture was fed with 5 liters of acetone, tightly closed in a vessel and allowed to stand overnight at 30° C. Thereafter, cell residue in the culture was separated by filtration, and the resulting extract was vaporized to dryness under reduced pressure. Subsequently, the residue was extracted 5 times at 60° C. with 500 ml. of methanol, and the combined extracts were charged to a granular active carbon column (4 cm. x 50 cm.; produced by Wako Jun-yaku) to adsorb an effective component onto the active carbon. The column was washed with 2.5 liters of a mixed solvent comprising methanol and water in a volume ratio of 3:1, and then eluted with aqueous saturated n-butanol to obtain 520 mg. of the desired effective substance.

Example 3

250 milliliters of one day old culture of Streptomyces 156 obtained as in Example 2 was seeded in a 10 liter-jar fermentor containing 5 liters of the same medium as in Example 1, and fermented at 30° C. for 36 hours. The amount of air introduced was 5 liters per minute, and the agitation was 350 r.p.m.

Thereafter, the cultured broth was separated by means of a basket type centrifugal separator into mycelium and a culture filtrate. The mycelium was extracted twice with 2 liters of acetone, and the culture filtrate was extracted with 2 liters of n-butanol. The extracts were combined and evaporated to dryness in vacuo. The crude sample thus obtained was purified in the same manner as in Example 2 to obtain 450 mg. of the pure antibiotic No. 156.

Example 4

A pyridine solution of the antibiotic (10 mg./ml.) was diluted with distilled water to a given concentration, and 0.01%, in terms of final concentration, of a spreader ("Rino" (transliteration), produced by Nippon Noyaku: 20% of alkyl phenol polyethyleneglycol, 12% of lignin sulphonic acid salt and the balance of water) was added to a diluted spray solution.

In a pot of 9 cm. in diameter containing soil, 20 rice grains (Saitama Mochi No. 10) just before germination were sowed, and at the three leaves' age each 50 ml. of drug solution per 3 pots was sprayed. The plants were dried in air and then again infected with rice blast by spraying spore suspension of Piricularia oryzae. The pots were kept in a moist chamber for 20 hours at from 24° to 27° C. and thereafter the pots were placed in a greenhouse. Seven days after infection, the total number of lesions in each area were counted and the protective value was calculated as follows:

Protective value (percent)
$$= \frac{\text{Number of lesions in non-treated area} - \text{Number of lesions in chemical-sprayed area}}{\text{Number of lesions in non-treated area}} \times 100$$

For evaluation of the effectiveness of each chemical, there was used an average number of lesions in a total of 60 seedlings in 3 pots per area. The number of lesions per seedlings in non-treated area was 35.5, and no phytotoxicity was observed.

| Chemical | Concentration (P.p.m.) | Control value (percent) |
|---|---|---|
| Antibiotic No. 156 | 80 | 97 |
| Do | 40 | 97 |
| Do | 20 | 97 |
| Do | 10 | 95 |
| Do | 5 | 90 |
| Do | 2.5 | 80 |
| Do | 1.25 | 63 |
| Kasugamycin | 20 | 98 |
| Non-treatment | | |

Example 5

Rice sheath blight disease-controlling effects in pot tests in greenhouse:

Test rice plants: Variety "Jikkoku," height about 60 cm., 10 leaves, immediately before emergence of ears, 15 stems per plant.

The above-mentioned test rice plants, which had been cultivated in pots, were placed on a turn table, sprayed by means of a spray gun with 50 ml. per 3 pots of the same spray solution of antibiotic No. 156 as in Example 4, and then allowed to stand for one day in a greenhouse kept at 25° to 30° C. Subsequently, each 10 leaf-sheaths of the plants were infected with sclerotiums of rice sheath blight fungus (*Pellicularia sasakii*) which had been prepared by subjecting said fungus to plane culture on a potato decoction-agar medium at 30° C. for 7 days. Each pot was covered for insulation with a vinyl sheet and then stored in a greenhouse kept at 26° to 34° C. Seven days after infection, the total length of lesions in each area was measured and the protective value was calculated as follows:

Protective value (percent)
$$= \frac{\text{Total length of lesions in non-treated area} - \text{Total length of lesions in treated area}}{\text{Total length of lesions in non-treated area}} \times 100$$

The results obtained were as set forth in the following table:

| Chemical | Concentration (P.p.m.) | Protective value (percent) |
|---|---|---|
| Antibiotic No. 156 | 100 | 82 |
| Do | 50 | 80 |
| Do | 25 | 35 |
| Do | 12.5 | 30 |

Example 6

Antibiotic No. 156 was subjected to bed test to investigate the rice blast disease-controlling effect thereof.

To a bed, 30 g. of ammonium sulfate, 30 g. of calcium superphosphate and 10 g. of potassium chloride per m.² were applied as basal fertilizers. Rice grains (variety: "Aichiasahi") in a proportion of 100 g. per m.² were sowed in the bed at intervals of 10 cm. in each area of 1 m.². On the 17th and 20th days after the sowing, rice plants were sprayed with 140 ml. per m.² of the same chemical as in Example 4. As a control chemical, an aqueous 1,000 times-dilution of "Kasumin Liquid" (containing 2% of Kasugamycin, produced by Hokko Kagaku Co.) was used. On the 25th day after the sowing, the effectiveness of each chemical was evaluated according to the damaged degree observation method. The results obtained were as set forth in the following table:

| Chemical | Concentration (P.p.m.) | Healthy degree | | | |
|---|---|---|---|---|---|
| | | Area 1 | Area 2 | Area 3 | Average |
| Antibiotic No. 156 | 80 | 80 | 85 | 75 | 80 |
| Do | 40 | 75 | 70 | 75 | 73 |
| Do | 20 | 60 | 70 | 50 | 60 |
| Do | 10 | 50 | 45 | 30 | 42 |
| Kasugamycin | 20 | 80 | 85 | 85 | 83 |
| Non-treated area | | | | | |

Since the outbreak of rice blast in nontreated area had been so vigorous and frequent, the rice plants in said area were completely withered. No phytotoxicity was observed in every treated area.

Example 7

Rice plants (variety: "Waseasahi No. 2"), the seeds of which had been sowed on May 16, were transplanted on June 10 in a proportion of 2 roots per 30 cm. x 15 cm. The amounts of fertilizers applied were 30 kg. of ammonium sulfate, 20 kg. of calcium superphosphate and 10 kg. of potassium chloride per 10 ares. On July 19, 10 kg. of ammonium sulfate was additionally applied. Each area was 9 m.² in size in which the rice plants were cultivated. On September 3 (when the rice plants began to come into ears) and on September 8 (when the rice plants all came into ears), the rice plants in each area were dusted with 4 kg. per 10 ares of a dust prepared by homogeneously mixing and pulverizing 0.2 part of antibiotic No. 156 and 99.8 parts of talc. As a control chemical, there was used "Kasumin Dust" (containing 0.2% of Kasugamycin; produced by Hokko Kagaku Co.). Early in July, the outbreak of rice leaf blast disease was first observed, but the extent thereof was slight. Thereafter, the outbreak of rice sheath blast disease was observed, but the extent thereof was medium and the progress of disease was slow. On October 4 and 13, the damaged degree of 20 rice plants in each area was investigated. On October 29, the rice plants in area of 3.3 m.² were moved to investigate the yields of rice grains. The results obtained were as set forth in the following table:

| Chemical | Damaged degree | | Weight of— | |
|---|---|---|---|---|
| | Oct. 4 | Oct. 13 | Unhulled rice (g.) | Unpolished rice (g.) |
| Antibiotic No. 156 | 3.93 | 10.87 | 1,890 | 1,500 |
| | 4.96 | 13.44 | 1,755 | 1,375 |
| Kasugamycin | 9.68 | 24.99 | 1,780 | 1,400 |
| | 7.78 | 19.36 | 1,715 | 1,350 |
| Non-treated area | 25.66 | 42.25 | 1,640 | 1,205 |
| | 24.82 | 39.96 | 1,595 | 1,150 |

NOTE.—The damaged degree was observed and calculated as follows Damaged degree = Rate (percent) of ears infected with ear blast disease +0.8 x Rate (percent) of stems infected with stem blast disease (damaged more than ⅔) +0.5 x Rate (percent) of stems infected with stem blast disease (damaged ⅔ to ⅓) +0.2 x Rate (percent) of stems infected with stem blast disease (damaged less than ⅓).

We claim:

1. Antibiotic No. 156 having the elementary analysis values of C, 55.07%, H, 7.82%, N, 6.33% and O, 29.92%, an optical rotation of $(\alpha)_D^{18}$ of +4.3° in aqueous n-butanol, a melting point of 210° C. or more, a molecular weight of 890, and the infrared and ultraviolet absorption spectra shown in the accompanying FIGS. 1 and 2, respectively.

2. A process for producing antibiotic No. 156 which comprises aerobically culturing *Streptomyces 156* (NRRL 5319) in a medium containing a carbon source, a nitrogen source and inorganic salts at a temperature of 25° C. to 35° C. for 1 to 5 days at a pH from 6 to 9.

3. A process according to Claim 2, wherein the carbon source is glucose, sucrose, molasses, starch or glycerine.

4. A process according to Claim 2, wherein the nitrogen source is polypeptone, yeast extract, meat extract or soybean flour.

5. A process according to Claim 2, wherein the inorganic salts are phosphoric acid salt, potassium salt, magnesium salt, calcium salt and sodium chloride.

6. A process for producing antibiotic No. 156 which comprises aerobically culturing *Streptomyces 156* (NRRL 5319) in a medium containing a carbon source, a nitrogen source and inorganic salts at a temperature of 25° C. to 35° C., for 1 to 5 days at a pH from 6 to 9 to produce antibiotic No. 156 and recovering said antibiotics.

7. A rise blast disease controlling composition containing an effective amount for controlling rice blast disease of antibiotic No. 156 and a carrier.

References Cited

Miller, The Pfizer Handbook of Microbial Metabolites, McGraw-Hill Book Co., Inc., New York, N.Y., 1961, pp. 546, 573, 578 and 581.

JEROME D. GOLDBERG, Primary Examiner

U.S. Cl. X.R.

195—80